United States Patent
Evans et al.

(10) Patent No.: US 8,538,389 B1
(45) Date of Patent: Sep. 17, 2013

(54) SYSTEMS AND METHODS FOR ACCESSING CONTENT AT AN EVENT

(75) Inventors: Chad Evans, New York, NY (US); Adam Ritter, New York, NY (US)

(73) Assignee: MLB Advanced Media, L.P., New York, NY (US)

( * ) Notice: Subject to any disclaimer, the term of this patent is extended or adjusted under 35 U.S.C. 154(b) by 2 days.

(21) Appl. No.: 13/175,241

(22) Filed: Jul. 1, 2011

Related U.S. Application Data

(60) Provisional application No. 61/361,166, filed on Jul. 2, 2010.

(51) Int. Cl.
  *G06F 21/24* (2006.01)
  *H04L 12/56* (2011.01)
  *H04H 20/71* (2008.01)

(52) U.S. Cl.
  USPC .......... 455/414.1; 455/418; 345/156; 700/94; 705/14.27; 705/14.64; 707/728; 707/754; 709/204; 709/206; 715/204; 715/753

(58) Field of Classification Search
  USPC ................ 455/418, 456.3; 705/14.27, 14.64; 726/30; 700/94; 709/204, 206; 345/156; 715/204, 753
  See application file for complete search history.

(56) References Cited

U.S. PATENT DOCUMENTS

| | | | | |
|---|---|---|---|---|
| 2012/0277893 | A1* | 11/2012 | Davis et al. | 700/94 |
| 2012/0278387 | A1* | 11/2012 | Garcia et al. | 709/204 |
| 2012/0280908 | A1* | 11/2012 | Rhoads et al. | 345/156 |
| 2012/0282905 | A1* | 11/2012 | Owen | 455/414.1 |
| 2012/0282911 | A1* | 11/2012 | Davis et al. | 455/418 |
| 2012/0284012 | A1* | 11/2012 | Rodriguez et al. | 704/1 |
| 2012/0284108 | A1* | 11/2012 | Fontana et al. | 705/14.27 |
| 2012/0284122 | A1* | 11/2012 | Brandis | 705/14.64 |
| 2012/0284339 | A1* | 11/2012 | Rodriguez | 709/204 |
| 2012/0284593 | A1* | 11/2012 | Rodriguez | 715/201 |
| 2012/0290950 | A1* | 11/2012 | Rapaport et al. | 715/753 |
| 2012/0317205 | A1* | 12/2012 | Lahiani et al. | 709/206 |
| 2012/0323909 | A1* | 12/2012 | Behforooz et al. | 707/728 |
| 2012/0323938 | A1* | 12/2012 | Skeen et al. | 707/754 |

* cited by examiner

*Primary Examiner* — William D Cumming
(74) *Attorney, Agent, or Firm* — Foley & Lardner LLP

(57) ABSTRACT

The accessing of event related content on a client device at an event techniques include a method, and non-transitory computer-readable storage medium. In some embodiments of these techniques, the method includes receiving a request to check-in to the event from the client device. The check-in request includes geographic location information of the client device. The method further includes determining whether the client device is located at a venue holding the event based on the received geographic location information of the client device and a first predetermined radius. The method further includes determining whether the event at the venue is in progress. The method further includes transmitting a first plurality of event information to the client device based upon determination that the client device is located at the venue and the event is in progress.

20 Claims, 18 Drawing Sheets

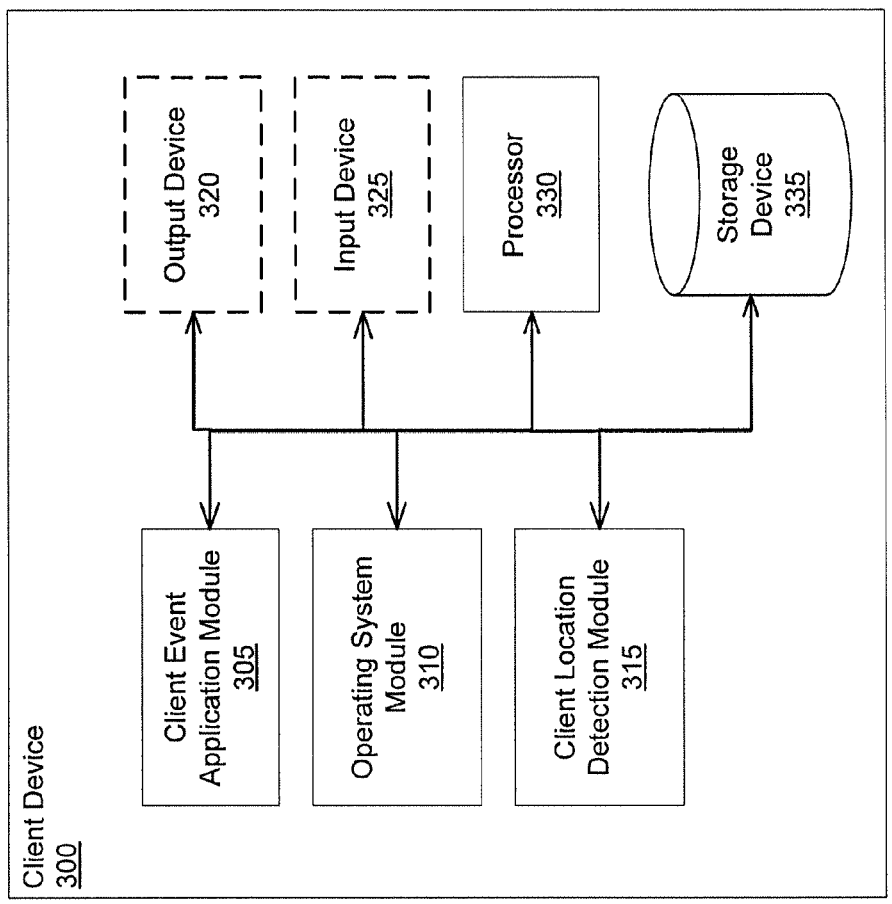

SYSTEMS AND METHODS FOR ACCESSING CONTENT AT AN EVENT

CROSS-REFERENCE TO RELATED PATENT APPLICATIONS

This application claims priority from Provisional U.S. Application 61/361,166, filed Jul. 2, 2010, incorporated herein by reference in its entirety.

BACKGROUND

1. Field of the Disclosure

Embodiments of the disclosure relate generally to systems and methods for accessing content and, in specific embodiments, to systems and methods for accessing content at an event relating to a venue of the event.

2. Related Art

Broadcasting venue-based content to devices at a venue has been available for well over a decade. In particular, for many years, attendees of an event have utilized hand held televisions to watch live broadcasts of an event, permitting the attendee to view the event from various perspectives provided by cameras located at different positions within the venue. Such handheld devices also permit the attendee to view replays of actions occurring at the event.

It is also known in the art to provide users with event related information during live events. For example, in the 1990s, one system utilized display units attached to seats at venues to provide on-screen statistics, on demand replays, and other general event information, along with a broadcast of the event. It was known to provide such display units with touch screens that allow users to manipulate the screen, and request various information about the event including team information, individual player information, event statistics, statistics for individual players, advertisements, etc. It has also been recognized in the field that such general information may be provided to wireless hand held devices, such as cellular telephones, personal digital assistants, and other hand held devices.

SUMMARY OF THE DISCLOSURE

Various embodiments provide a system and/or a method that allows users to receive personalized information or other information that is related to a particular venue. One approach to accessing content on a device at an event is a method that includes receiving a request to check-in to the event from the client device. The check-in request includes geographic location information of the client device. The method further includes determining whether the client device is located at a venue holding the event based on the received geographic location information of the client device and a first predetermined radius. The method further includes determining whether the event at the venue is in progress. The method further includes transmitting a first plurality of event information to the client device based upon determination that the client device is located at the venue and the event is in progress.

BRIEF DESCRIPTION OF THE DRAWINGS

FIG. 3 is a block diagram illustrating an exemplary client device according to an embodiment of the present invention;

DETAILED DESCRIPTION OF THE DISCLOSURE

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
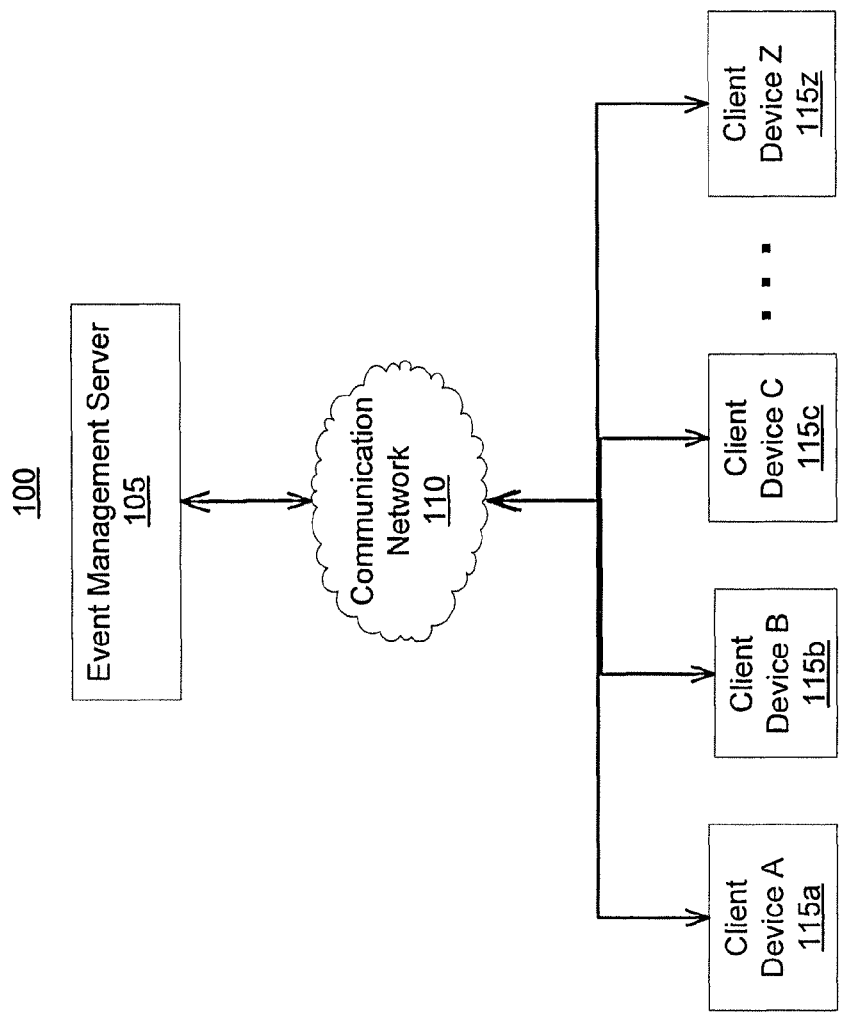
FIG. 1 is a block diagram illustrating an exemplary system according to an embodiment of the present invention.

FIG. 1 illustrates an exemplary system 100 for providing event content on a client device. The system 100 includes a communication network 110 (e.g., internet protocol (IP) network, a local area network (LAN), internet, wireless network, such as a Wi-Fi network, and/or the like), an event management server 105, and client devices A 115*a*, B 115*b*, C 115*c* through Z 115*z*. A client device (e.g., A 115*a*-Z 115*z*) may be a mobile device. The event management server 105 may manage information associated with various events. The event management server 105 may receive requests for information associated with events from the client devices A 115*a*, B 115*b*, C 115*c* through Z 115*z*. In response to the requests, the event management server 105 may transmit event information to the client devices A 115*a*, B 115*b*, C 115*c* through Z 115*z*. In some embodiments, when a client device (e.g., A 115*a*-Z 115*z*) is located at a venue holding an event, and while the event is in progress, the event management server 105 may transmit additional event information to this client device.

Although FIG. 1 illustrates a single communication network 110, the system 100 can include a plurality of communication networks and/or the plurality of communication networks can be configured in a plurality of ways (e.g., a plurality of interconnected local area networks (LAN), a plurality of interconnected wide area network (WAN), a plurality of interconnected LANs and/or WANs, a plurality of interconnected Wi-Fi networks, etc.). Although FIG. 1 illustrates a single event management server 105 and client devices A 115*a*, B 115*b*, C 115*c* through Z 115*z*, the system can include any number of event management servers, and/or client devices.

Figure 2:
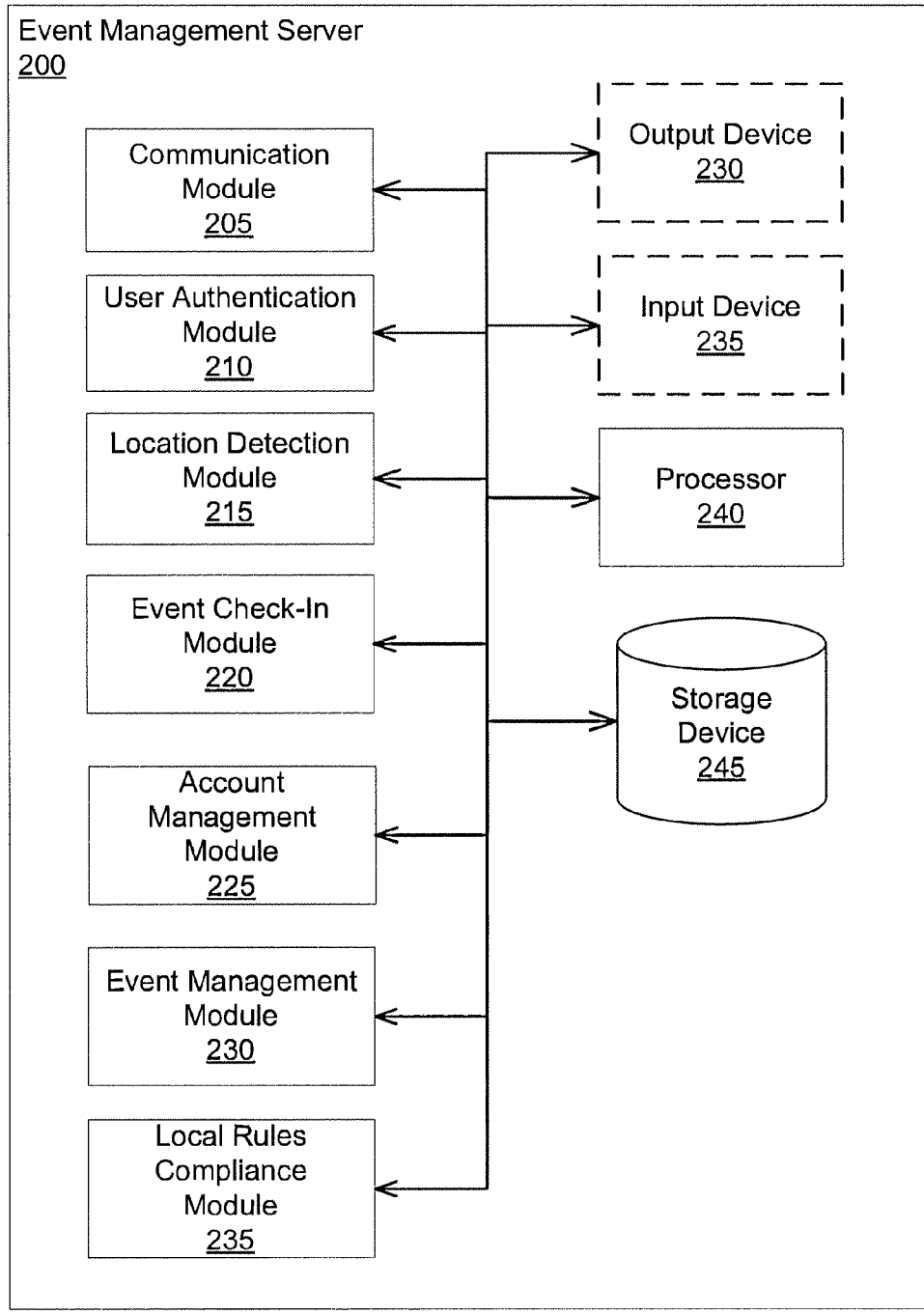
FIG. 2 is a block diagram illustrating an exemplary event management server according to an embodiment of the present invention.

FIG. 2 illustrates an exemplary event management server 200. The event management server 200 includes a communication module 205, a user authentication module 210, a location detection module 215, an event check-in module 220, an account management module 225, an event management module 230, a local rules compliance module 235, an output device 240, an input device 245, a processor 250, and a storage device 255. The modules and/or devices can be hardware and/or software. The modules and/or devices illustrated in the event management server 200 can, for example, utilize the processor to execute computer executable instructions and/or include a processor to execute computer executable instructions (e.g., an encryption processing unit, a field programmable gate array processing unit, etc.). It should be understood that the event management server 200 can include, for example, other modules, devices, and/or processors known in the art and/or varieties of the illustrated modules, devices, and/or processors. It should be understood that the modules and/or devices illustrated in the event management server 200 can be located within the event management server 200 and/or connected to the event management server 200 (e.g., directly, indirectly, etc.), but outside of the physical components of the event management server 200 (e.g., personal computer, mobile device, etc.). In other embodiments, one or more of the modules illustrated in the event management server 200 may be located within the client device (e.g., A 115a-Z 115z).

The communication module 205 communicates data to/from the event management server 200. The user authentication module 210 authenticates users to the event management server 200. The location detection module 215 may determine geographic location of users' client devices (e.g., A 115a-Z 115z). Based on the geographic location of a client device, the location detection module 215 may determine whether the client device is at a venue. The event check-in module 220 manages checking users into various events. The event check-in module 220 may determine whether a client device is at a live event. The account management module 225 manages user accounts associated with various client devices.

The event management module 230 manages and/or processes information associated with various events and venues. The event management module 230 is configured to request, manage, and/or persist information regarding events and venues that each user has attended, including (but not limited to) each user seat information, restaurants and/or concessions visited by each user during an event, event and/or venue information requested by each user during an event, etc. The event management module 230 is configured to analyze the event information for each user and/or aggregate the collected user information. The event management module 230 may transmit personalized information (e.g., personalized advertisement) to users checked into events based on the analysis of the collected historical information about the users.

The local rules compliance module 235 is configured to manage local rules, laws, and/or regulations (e.g., privacy laws) for various locations. The local rules compliance module 235 may check whether collection of information on a client device is in compliance with the local rules based on the geographic location of the client device. When the local rules compliance module 235 detects collection of information that is not compliant with local rules, the local rules compliance module 235 may communicate to other modules about the non-complying activities.

The output device 240 outputs information and/or data associated with the event management server 200 (e.g., information to a printer (not shown), information to a speaker, etc.). The input device 245 receives information associated with the event management server 200 (e.g., instructions from a user, instructions from a computing device, etc.) from a user (not shown) and/or a computing system (not shown). The input device 245 can include, for example, a keyboard, a scanner, and/or the like.

The processor 250 executes the operating system and/or any other computer executable instructions for the event management server 200 (e.g., executes applications, etc.). The event management server 200 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 275 stores (but is not limited to) user account information, information related to various events, information regarding one or more venues including predetermined venue coordinates, access information, an operating system and/or any other data or program code associated with the event management server 200. The storage device 275 can include a plurality of storage devices. The storage device 275 can include, for example, long-term storage (e.g., a hard drive, a tape storage device, flash memory, etc.), short-term storage (e.g., a random access memory, a graphics memory, etc.), and/or any other type of computer readable storage.

Although FIG. 2 illustrates the exemplary event management server 200, one or more servers not shown can include the components and functionality described with respect to the event management server 200.

FIG. 3 illustrates an exemplary client device 300, which may be or similar to one or more of the client devices A 115a, B 115b, C 115c through Z 115z (refer to FIG. 1). With reference to FIGS. 2-3, the client device 300 includes a client application module 305, an operating system module 310, a client location detection module 315, an output device 320, an input device 325, a processor 330, and a storage device 335. The modules and/or devices can be hardware and/or software. The modules and/or devices illustrated in the client device 300 can, for example, utilize the processor 330 to execute computer executable instructions and/or include a processor to execute computer executable instructions (e.g., an encryption processing unit, a field programmable gate array processing unit, etc.). It should be understood that the client device 300 can include, for example, other modules, devices, and/or processors known in the art and/or varieties of the illustrated modules, devices, and/or processors. It should be understood that the modules and/or devices illustrated in the client device 300 can be located within the client device 300 and/or connected to the client device 300 (e.g., directly, indirectly, etc.), but outside of the physical components of the client device 300 (e.g., personal computer, mobile device, etc.).

The client event application module 305 operates an event application on the client device 300. The client event application module 305 may provide one or more interfaces (e.g., FIGS. 6A-6J) on the client device 300 displaying event and/or venue related content to a user. For example, using the client event application module 305, the user can check into an event on the client device 300 and obtain access to additional information regarding the event, where the additional information is information other than the event itself as seen by the viewer, either directly or via a live transmission of the event. The additional event information may include (but is not limited to) event statistics, news, commentary, information about other events that may be of interest to the user, transportation information, traffic information in areas near the venue, weather updates, recorded video, such as highlights and instant replays, and/or any other type of event or venue related information. The highlights and instant replay may be available while the event is in progress. In some embodiments, the client application module 305 may request an instant replay. In other embodiments, the event management module 230 may automatically send information associated with an instant replay.

When a user leaves an event, information regarding the event attended by the user may be saved (e.g., by the account management module 225 and/or the client event application module 305), and later available to the user on the client device 300. In some embodiments, this event information may be available to the user for a predetermined period of time after the event is over (e.g., one month, one year, etc.). In some embodiments, the event information (e.g., video highlights) available to the user after the event may include information that is only available to event attendees. The client event application module 305 communicates with the event management server 200. The operating system module 310 operates an operating system on the client device 300. The client location detection module 315 determines and/or provides geographic location of the client device 300.

The output device 320 outputs information and/or data associated with the client device 300 (e.g., information to a printer (not shown), information to a speaker (not shown), etc.). The input device 325 receives information associated with the client device 300 (e.g., instructions from a user, instructions from a computing device, etc.) from a user (not shown) and/or a computing system (not shown). The input device 325 can include, for example, a keyboard, a scanner, and/or the like.

The processor 330 executes the operating system and/or any other computer executable instructions for the client device 300 (e.g., executes applications, etc.). The client device 300 can include random access memory (not shown). The random access memory can temporarily store the operating system, the instructions, and/or any other data associated with the client device 300. The random access memory can include one or more levels of memory storage (e.g., processor register, storage disk cache, main memory, etc.).

The storage device 335 stores user account information (e.g., social networks account information such as FACE-BOOK social network account information, TWITTER social network account information, FOURSQUARE social network account information, etc.), user preferences, events the user has previously checked into, special content associated with attended events available to the user, an operating system, and/or any other data or program code associated with the client device 300. The storage device 335 can include a plurality of storage devices. The storage device 335 can include, for example, long-term storage (e.g., a hard drive, a tape storage device, flash memory, etc.), short-term storage (e.g., a random access memory, a graphics memory, etc.), and/or any other type of computer readable storage. In some embodiments, the storage device 335 includes one or more hard drives.

Figure 4A:
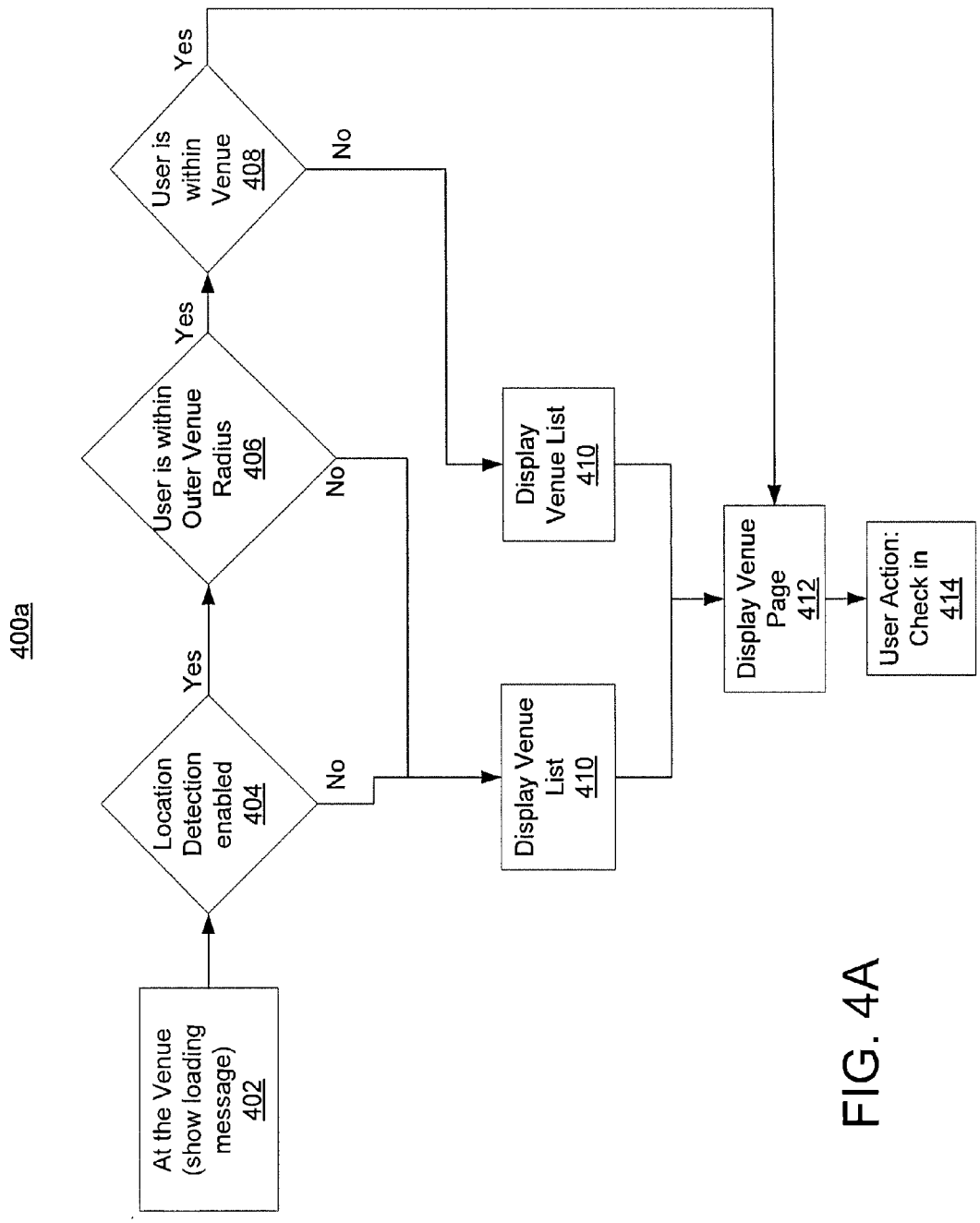
FIGS. 4A-4C are flowcharts illustrating an exemplary event check-in process according to an embodiment of the present invention.
Figure 4B:
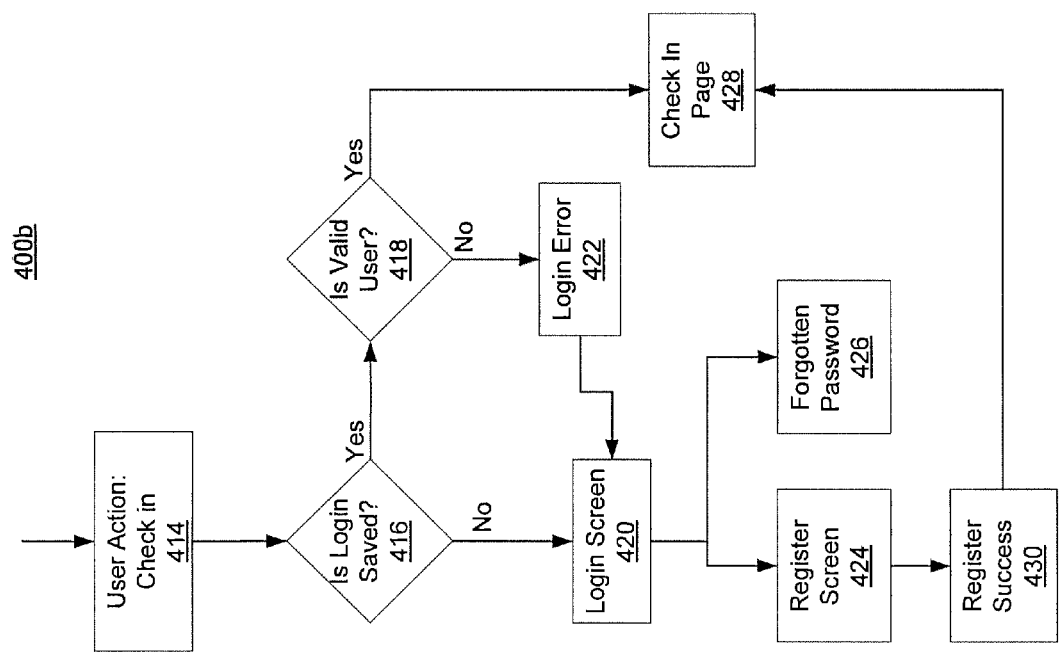
Figure 4C:
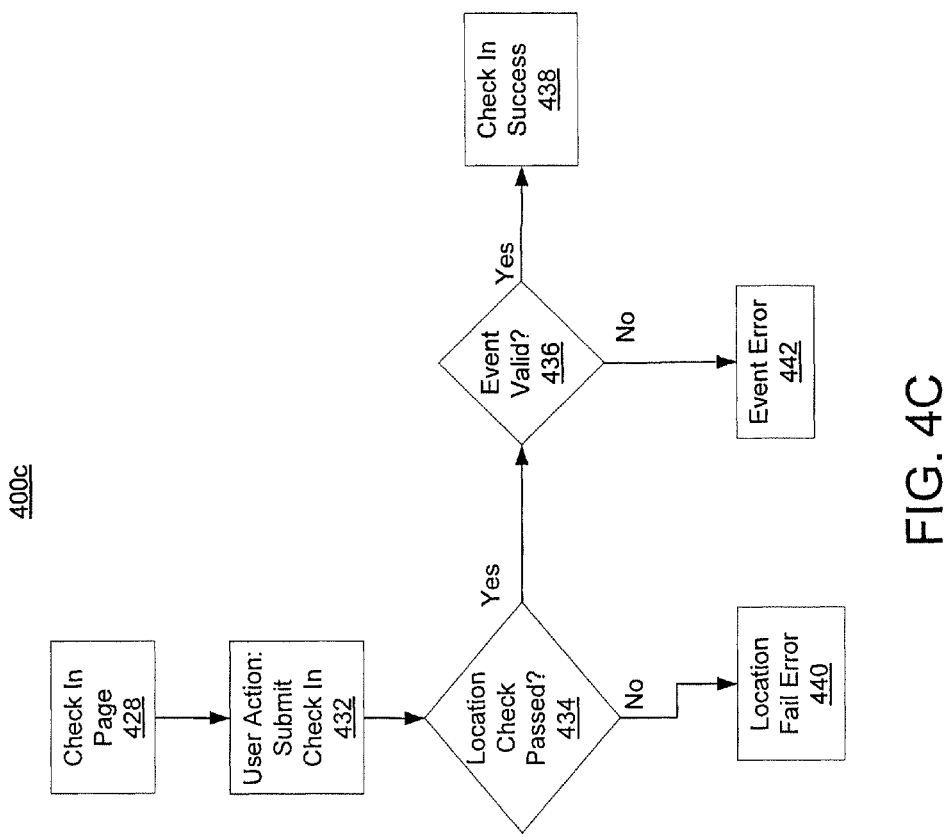

In FIGS. 4A-4C, flowcharts relating to a user checking in to an event using a client device are shown, according to exemplary embodiments. With reference to FIGS. 2-4C, once a user successfully checks into an event, additional content and functionality may be provided to the user on the client device 300. In some embodiments, special content may be provided for users who have checked into the event. In these embodiments, general content may be available independently of whether the user is at the venue. The special content includes live digital content related to the checked-in event such as expanded highlights sections (e.g., close plays that are not part of the general content). The special content may include special marketing offers by participating sponsors. In some embodiments, the special content may include awards based on the user's event check-in history and one or more predefined event achievements. The account management module 225 may aggregate check-in experiences to determine whether the user qualifies for an award. For example, if the user has checked into all baseball stadiums across a league, the user may be given an award upon check-in into the event. In another example, a user is given an award when the user sees the home team win a predetermined number of games (e.g., 10). In some embodiments, the special content may include awards based on other factors, such as occurrences (e.g., a no hitter, a home run, setting a record, etc.) that take place during the event. In a case where the occurrence takes place at the end of a game, the reward may be received immediately or after some delay (e.g., a few hours, a few days, etc.).

In various embodiments, the awards or offers may be redeemed at the venue. Such award could include a free (or discounted) drink or food item at a concession stand, for example. For instance, the user could be provided an electronic bar code or the like that can be scanned at the venue to redeem their award. In other embodiments, the awards or offers may be redeemed at a location remote from the venue, such as online or at a retail ("brick and mortar" store. In some embodiments, the awards or offers are sponsored.

In some embodiments, once checked into the event, the user may be able to watch other live events (e.g., another baseball game taking place at the same time as the event the user checked into). In some embodiments, once the user checks into an event using a free application, the special content may be available to the user that is also available in a paid application (e.g., phone application).

FIG. 4A illustrates a flowchart 400*a* relating to determining whether a client device (e.g., 300 in FIG. 3) is at a venue. With reference to FIGS. 2-4A, in some embodiments, two levels of location detection may be provided. In some embodiments, the client location detection module 305 may determine geographic location (step 406) of the client device 300 (e.g., when the user first attempts to access the venue section of the application). The client location detection module 305 may determine the current latitude and longitude of the client device 300 based on GPS, cell-tower, Wi-Fi triangulation, and/or the like. The coordinates provided by the client event application module 305 to the event management server 200 may be accompanied by a radius of confidence. The higher the confidence level, the longer the detection may take. The radius of confidence used by the client event application module 305 may be configurable for the narrow and the wide location check. For example, sample values for the checks may default to 100 meters, while a wide test may default to 1 kilometer.

The location detection module 215 may use geographic location of the client device 300 to determine if the user is inside the venue (step 408) defined by a narrow radius. The location detection module 215 receives the user's location coordinates and maps those coordinates against a predefined coordinate map of the venue. In some embodiments, each venue's coordinates may be configured and can be defined with a center point of the stadium, and one or more predetermined radiuses. In other embodiments, each venue's coordinates may be defined as a set of three or more points forming a custom polygon. The event management module 230 may transmit (e.g., in JAVA Script Object Notation format) to the client event application module 305 a list of nearby venues, distance the user is from each venue, additional venue data, and/or an indication of whether the user is inside the venue (e.g., a Boolean value).

If the user is in the venue, the client event application module 305 may display (step 412) options available for the current venue. If the user is not inside the venue, the location detection module 215 may check the location of the client device 300 against a wider radius to see if the user is near a venue. The location detection module 215 may use a predefined radius of error to determine whether the user is inside the venue. The event check-in module 220 may provide (step 410) a list of one or more venues and the user's distance from each venue to the client device 300. The client event application module 305 may list the venues inside the wider radius by shortest distance and then list the remaining venues alphabetically. In some embodiments, the user may disable location detection or may not be near any venue. In these embodiments, the client event application module 305 may display listing of available venues (e.g., in alphabetical order).

In some embodiments, the client event application module 305 (or the like) determines whether an event is taking place at the venue at the time the user checks in. If the user is inside the venue, but outside an event period, a determination may be used to check whether the current time is window a wider range to see if the check-in is sufficiently close to the time of the event. Thus, in various embodiments, certain content is available to the user only if the user is at (or sufficiently close to) the venue and also within (or sufficiently close to) a time period of an event at the venue. For example, a user is presented additional special content when checking in at FENWAY PARK stadium between 6:00 pm and midnight for a RED SOX home game scheduled at 7:05 pm. Meanwhile, a user who attempts to check in at, for example at 1:00 pm (i.e., when there is no game scheduled or not sufficiently close to the start or end of a schedule game), the user is not presented with the additional content.

FIGS. 4B-4C illustrate flowcharts 400b and 400c related to allowing users check into an event. With reference to FIGS. 2-4C, a user can login into an existing account or register a new account associated with the client event application module 305 (e.g., using an interface illustrated in FIG. 6I). As described above, the location detection module 215 may verify that the user is at the location of the event. The event check-in module 220 may determine whether the event is in progress (e.g., using identification of the event, event status, and/or the start-time of the event). In some embodiments, checking-in to an event may be allowed up to a pre-determined time before the event begins. In some embodiments, the event check-in module 220 may persist the history of the user's event check-ins will be maintained to provide continued access to content associated with the event. The event check-in module 220 may archive usage of the content (e.g., for use in any incentive based social gaming applications, etc.). In some embodiments, the history of the user's event check-ins is stored in the storage device 245 located in the event management server 200. In other embodiments, the history of the user's event check-ins is stored in the storage device 335 located in the client device 300. Using the user login information, the user may access the special content associated with attended events using different devices (e.g., personal computer, mobile device, etc.). For example, the user may be able to view a list of stadiums or venues attended, number of times each venue was attended, statistical information (e.g., how many times the user saw the home team win), an archive of event experiences (e.g., home runs in baseball games). The user may customize his or her account by selecting favorite teams, club logos, etc.

In some embodiments, the usage of the content or other application data can be aggregated and made available to other parties (e.g., baseball clubs, leagues, sponsors, etc.). Such embodiments, for example, may provide information to the other parties about who is checking into and/or attending games, when are fans checking in, whether season ticket holders or the like are giving their tickets away, etc.

Once the user has successfully checked-in to the event, the user will gain access to special event content. The check-in will be tied to the user account so that the content access will persist once the event concludes. In some embodiments, the user can check-out of the event and the time of the check out may be stored in the user's account data. In some embodiments, if the event is invalid (i.e., the event is not in progress), an event error page is shown to the user stating that the selected event is invalid.

Figure 5A:
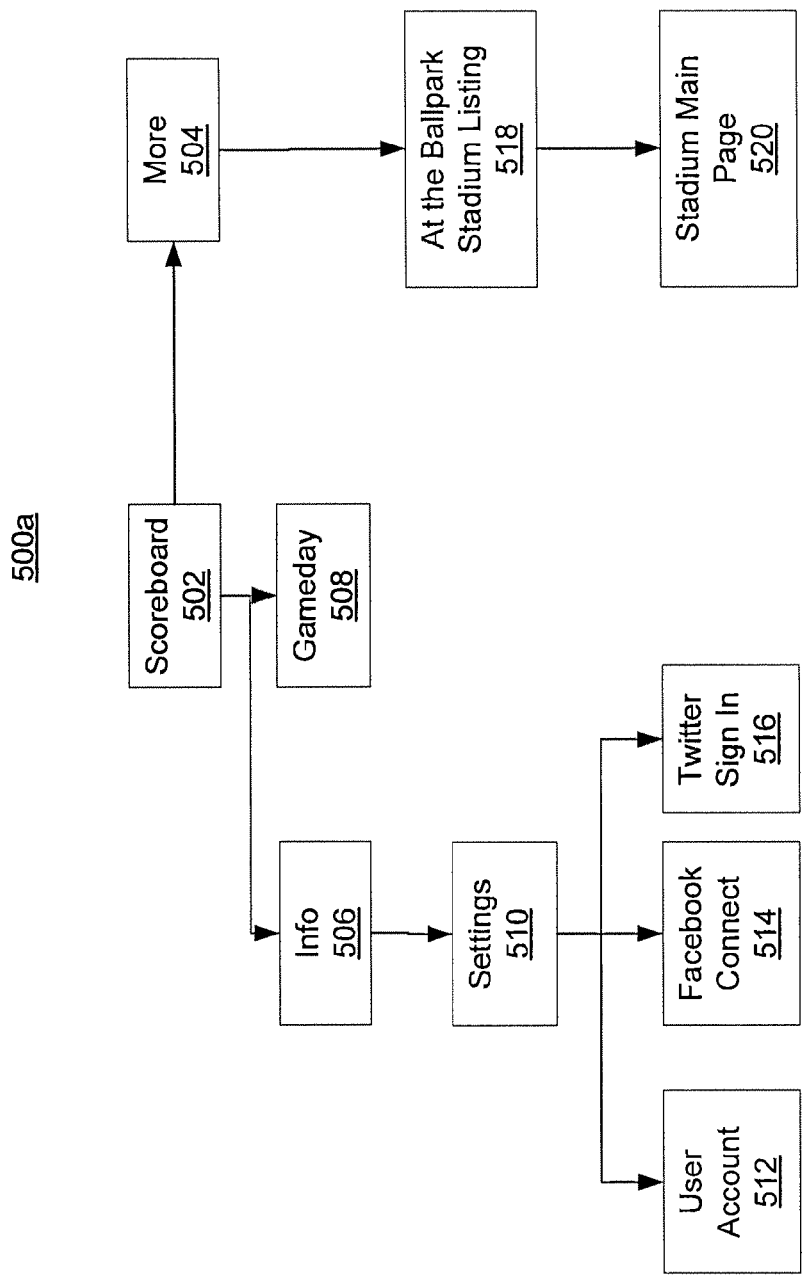
FIGS. 5A-5C are block diagrams of exemplary user interfaces according to an embodiment of the present invention.
Figure 5B:
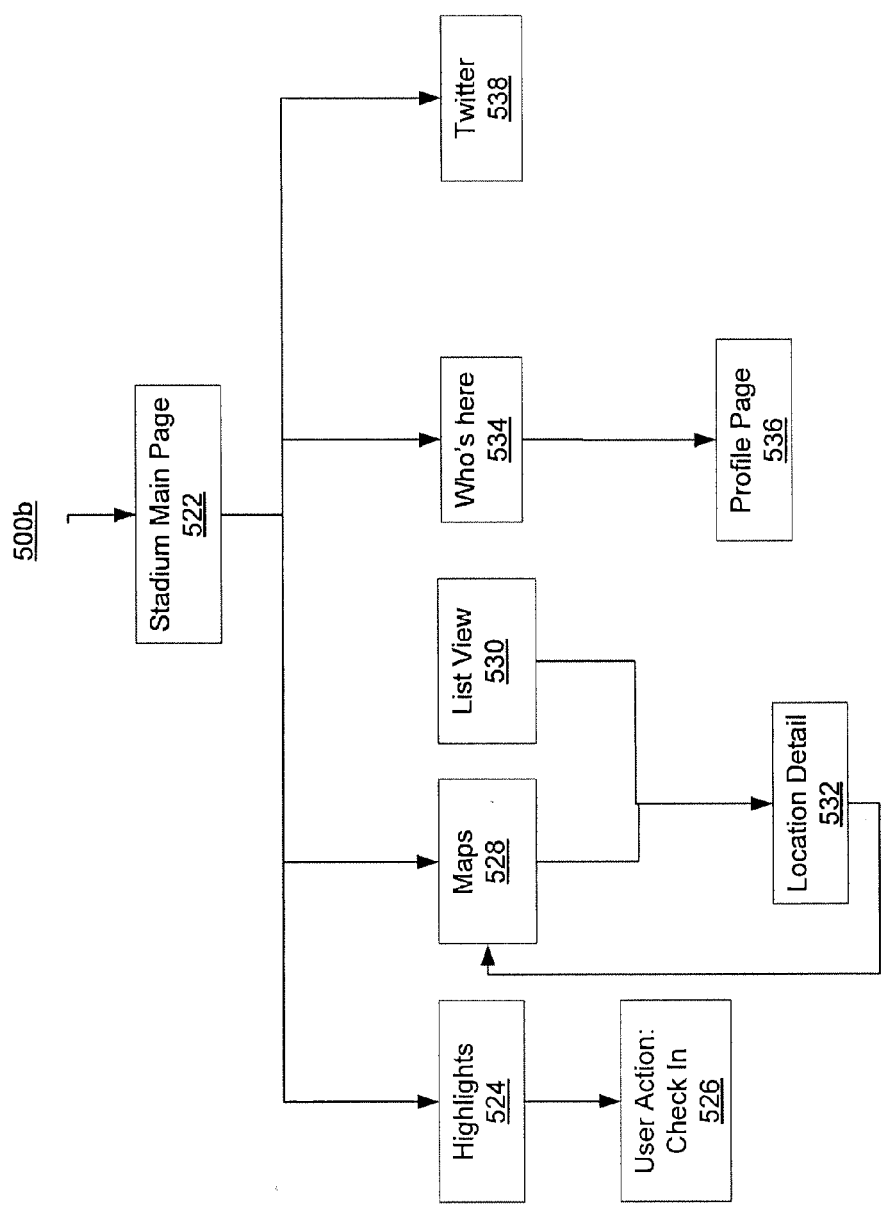

With reference to FIGS. 3, 5A, and 5B, the client event application module 305 may provide interfaces for the user to access a user account 512 associated with the client event application module 305, a FACEBOOK account 514, and/or a TWITTER account 516. The user may view information associated with an event (e.g., a baseball game) including score information. FIG. 5B illustrates categories of information that the client event application module 305 may provide to the user on the client device. For example, the client event application module 305 may provide a "stadium main page" 520, 522, which includes highlights, maps, list view, a link to a social network such as TWITTER social network, etc. The user may check into an event using the "stadium main page" 520, 522 or another interface provided by the client event application module 305.

Figure 5C:
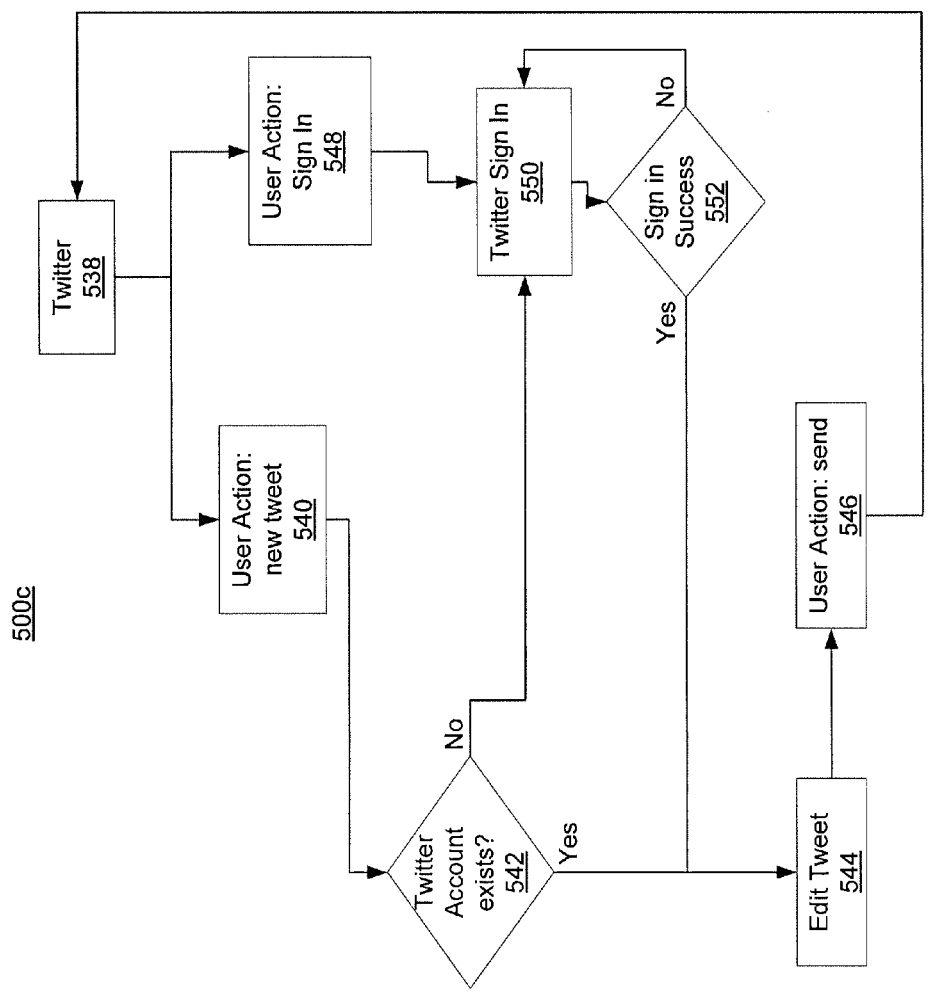

With reference to FIGS. 3 and 5A, the check-in service may link to popular social network applications, such as TWITTER social network 516, a FACEBOOK social network 514, FOURSQUARE social network, GOWALLA social network, etc., so that users can share their check-ins and/or check-outs as status updates. The client event application module 305 may let the user connect to these services to send an automatic notification when an event check-in occurs. For example, a sample default notification can include: [Username] has checked into [Venue] to attend [Event Name]. In some embodiments, the user can override or append to the default status update or decide not to share the check-in for the specific event. An account section of one or more of the interfaces provided by the client event application module 305 can provide the ability to logout of any connected social applications at any time. FIG. 5C illustrates a user logging into a TWITTER account 500c, and posting a message or status update. The client event application module 305 (refer to FIG. 3) may provide an interface for accessing a TWITTER account.

With reference to FIGS. 3-5C, in some embodiments, users may be available to access live TWITTER feeds as the events are going on. The feeds will show all TWEET messages about the event, all TWEET messages at the location of the event as determined by the TWITTER geo-tagging capability and all the replies to the user. In some embodiments, in order to see the replies, the user must be logged into the TWITTER social network. In some embodiments, the user may be allowed to send a TWEET message using the client event application module 305, with geotagging enabled. In some embodiments, users may be able to locate friends or other individuals at the event. In further embodiments, the users may be able to pinpoint the location of the friends or other individuals relative to the users.

The client event application module 305 may provide one or more of the following views or user interfaces: General Venue Listing View, Venue Listing Page with nearby venues shown, Venue Main View, Highlights View, Directory/Map View, Directory/List View, Map Level switches, Location Detail View, Clicking tracking for map interactions, Who's here View, User profile View, TWITTER—Everyone Timeline, TWITTER—At Venue Timeline, TWITTER—Replies Timeline, New TWEET message, New TWEET message sent, Location error, Check-in attempt, Check-in Page View, Check-in error, Check-in success, FACEBOOK Connect View, Login View, Register View, Forgotten Password View, and/or the like. In some embodiments, the client event application module 305 may display to the user all the TWEET messages associated with the event the user has checked into. In these embodiments, the TWEET messages may cover topics such as the home team and the opponents, topics about the event (e.g., baseball game) and/or the venue, etc. Accordingly, the client event application module 305 may construct and run custom TWITTER searches (or searches for another social network) in order to display to the user TWEET messages regarding the event. In some embodiments, the client event application module 305 may display to the user a list of other users (e.g., login names, users' TWITTER names, etc.) who have checked into the event.

Figure 6A:
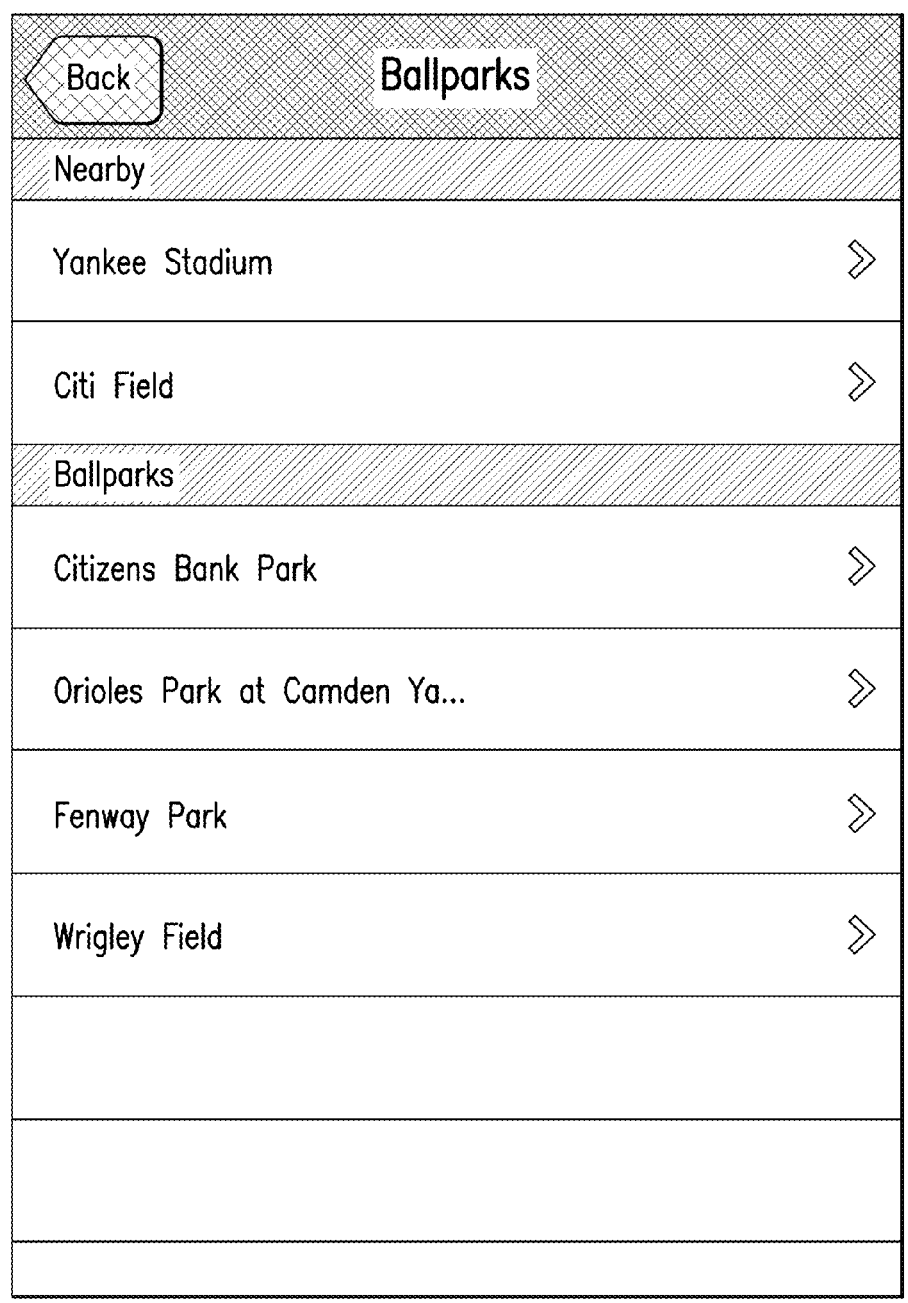
FIGS. 6A-6I are exemplary user interfaces according to an embodiment of the present invention.
Figure 6B:
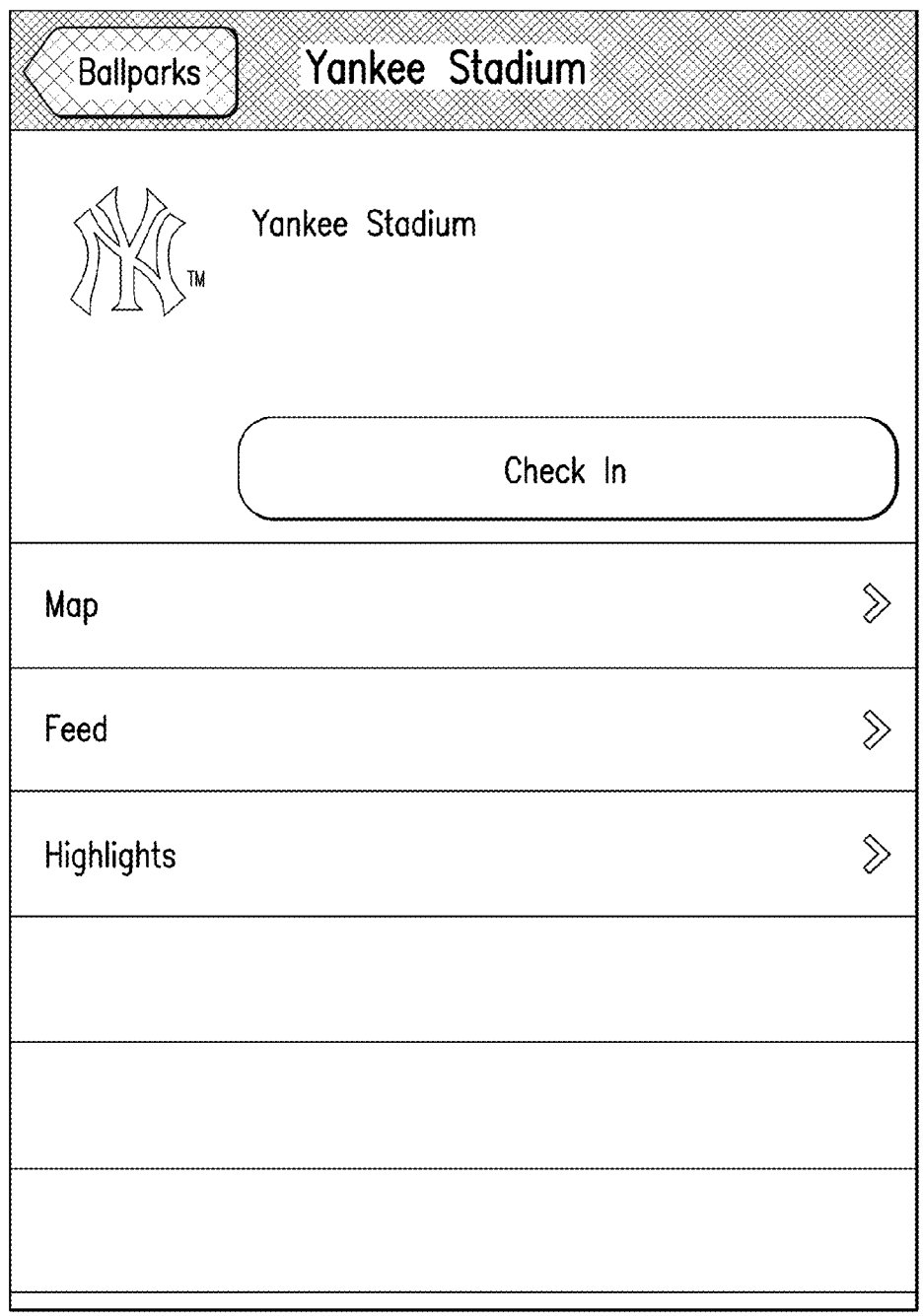

FIGS. 6A-6I illustrate exemplary user interfaces provided by the client event application module 305 (refer to FIG. 3). FIG. 6A illustrates an exemplary user interface 600a allowing the user to view various venues (e.g., ballparks) located near the user using the client device (e.g., 300 in FIG. 3). For example, the interface may provide distance information from the client device to each listed venue. After the user selects a specific venue (e.g., YANKEE STADIUM), the client event application module 305 may display an exemplary user interface 600b illustrated in FIG. 6B. FIG. 6B displays general content available to a user including "map," "feed," and "highlights" of an event happening at the selected venue. This general content may be provided regardless of whether the user is physically at the venue. The user interface 600b illustrated in FIG. 6B provides the user with an option to check into the event.

Figure 6C:
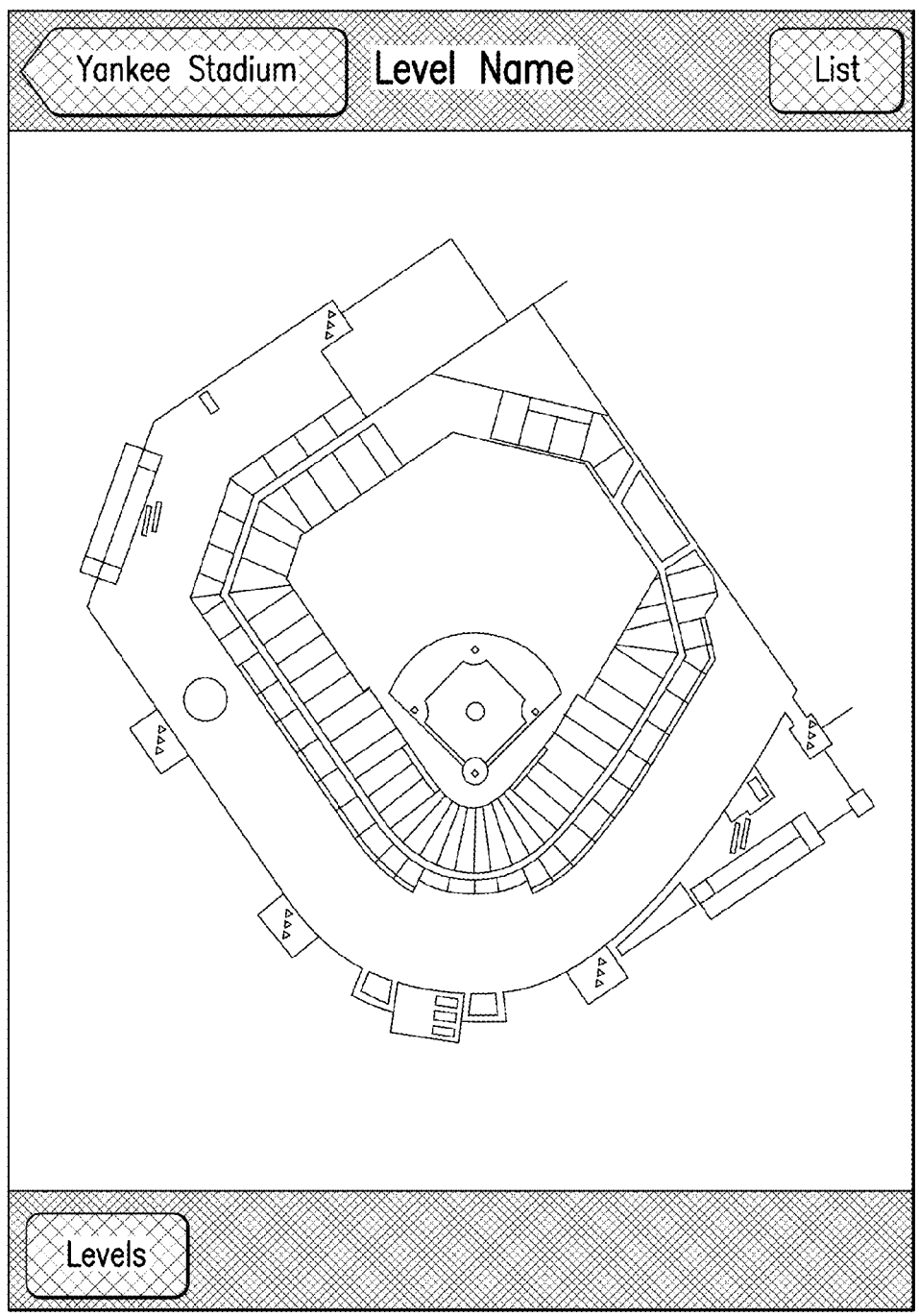
Figure 6D:
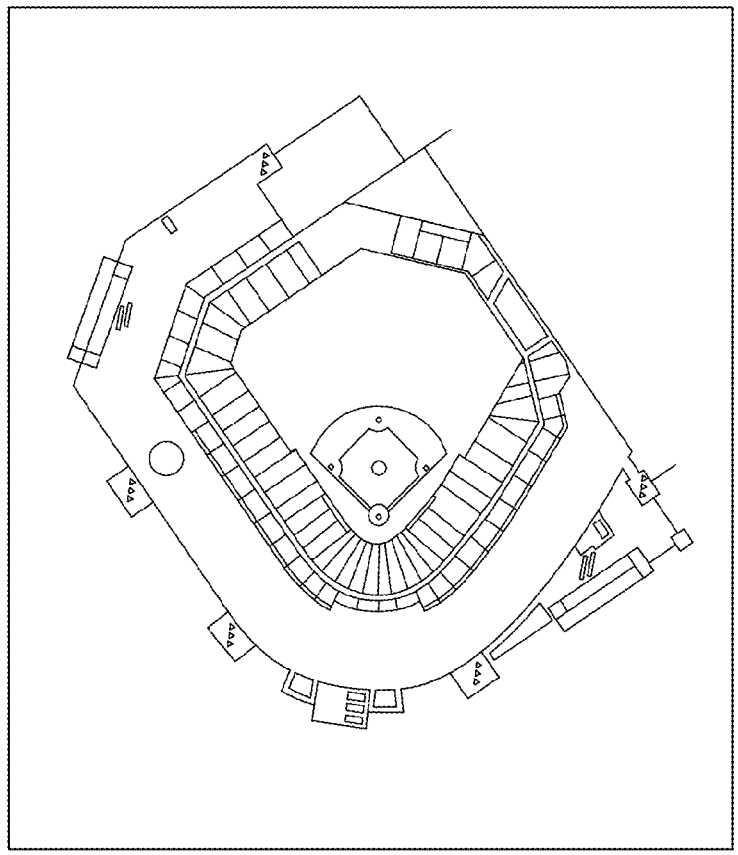
Figure 6E:
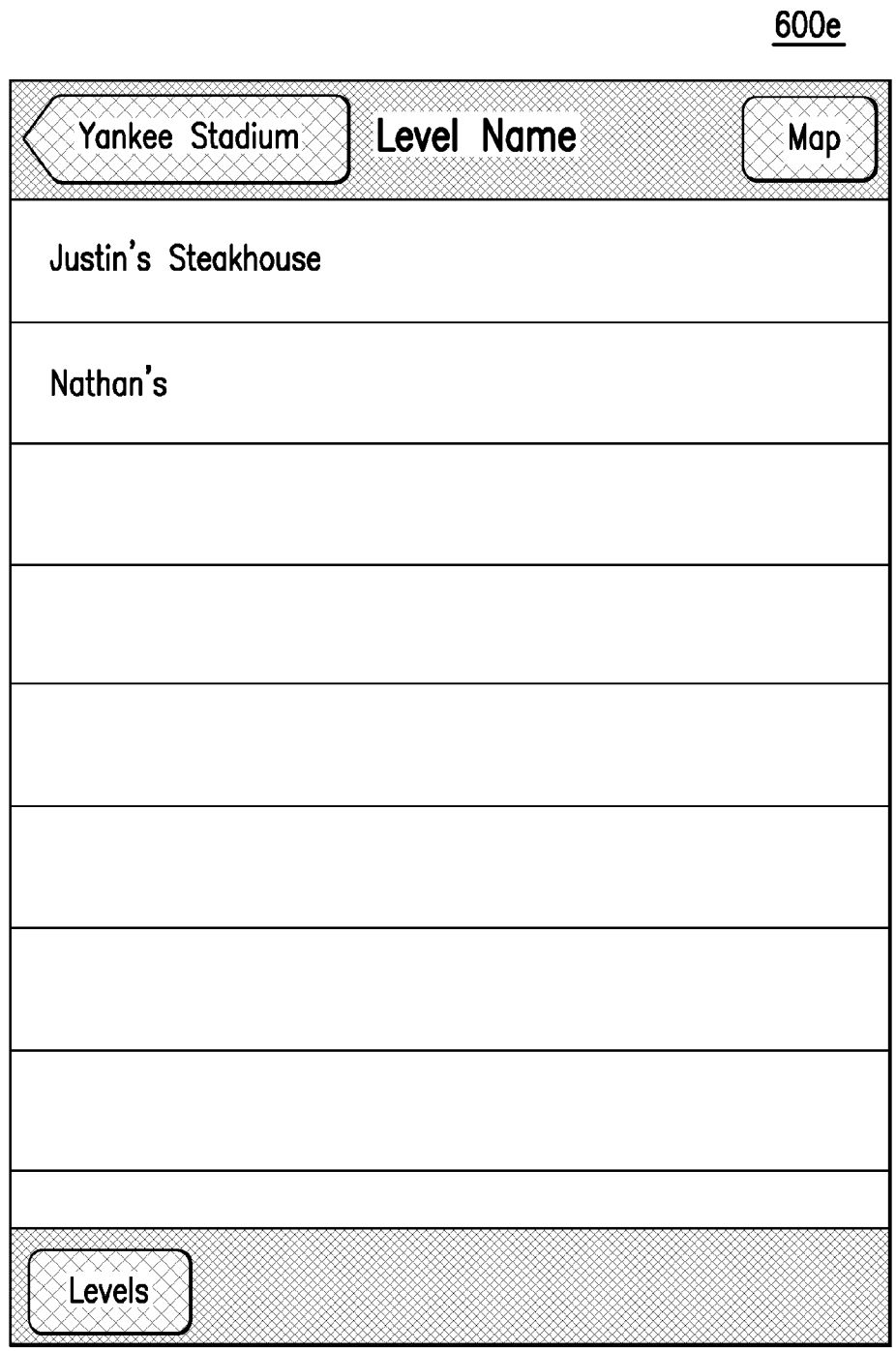
Figure 6F:
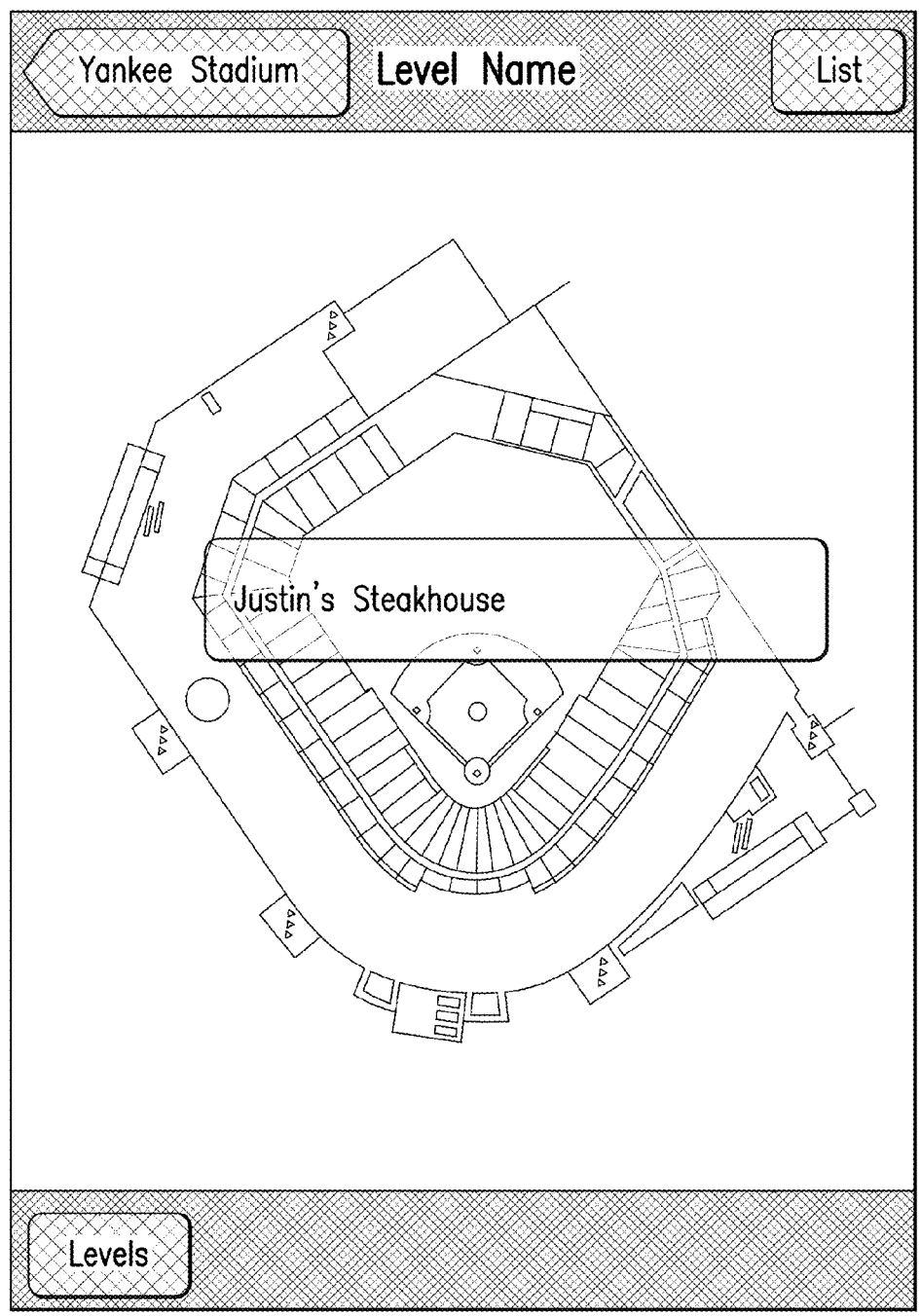

A venue directory user interface may provide users with the ability to see maps and listings of all the facilities available at a venue whether the user is at the event or not, including (but not limited to) food and beverage concessions, restrooms, disabled access, information booths, shopping, ATMs, picnic or family areas, sponsor booths, escalators, gates, sections, etc. The venue directory interface may provide an interactive map of the venue, broken out by level allowing users to pinpoint facilities. The user interface may also provide a list view of facilities, sorted both alphabetically and by type. The user interface may provide information about the venue relative to the user's seat and/or current location. For example, the user interface may display the nearest restroom, nearest concession stand, shortest route to/from parking spot (or bust stop, subway station, or the like), etc. FIGS. 6C-6D and 6F provide exemplary user interfaces 600c-600d and 600g illustrating maps of various levels at YANKEE STADIUM. These maps may be accessed by the user by clicking on the "Map" option shown in FIG. 6B. In some embodiments, the map may activate when the user is determined to be within proximity of the venue. The user interface may display a list of all levels available at the venue.

By clicking on one of the listed levels, the user may access a map of that level. In some embodiments, the user may click on various locations displayed on a map. The user may request a list of restaurants or other concessions available on a particular level. An exemplary interface 600e illustrated in FIG. 6E may display a list of restaurant or concession options. Each concession stand and shopping location may have a listing view showing general information and a link to view the location on the map. Food venues will provide menus of available options and Shopping will provide lists of the available items. By clicking on one of the restaurants, the map of the level with an indication of the location of the selected restaurant may be displayed as illustrated in FIG. 6F. Other information associated with a selected restaurant or concession may be displayed such as menu and price information. In some embodiments, the user may be able to order and/or redeem offers from restaurants or concessions available at the venue using the client device. The user may go to the restaurant or concession stand to pick up the order. In other embodiments, the order may be delivered to the user at the user's seat, location of the user, or some other location. The user may pay for the order when the order is received or picked up. In other embodiments, the order may be paid for via the client device (e.g., bill a credit card associated with the application or client device).

Figure 6G:
Figure 6H:
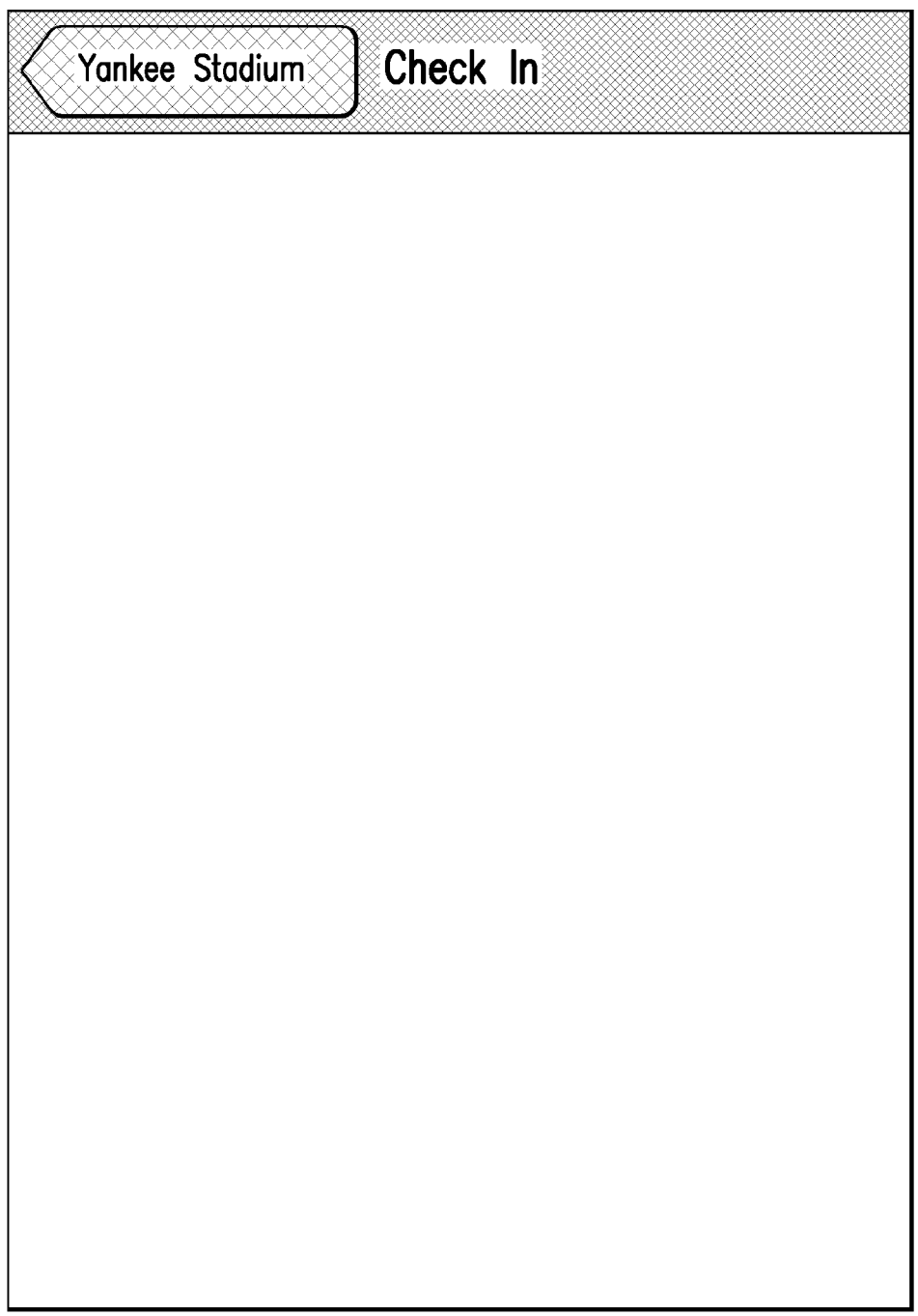
Figure 6I:
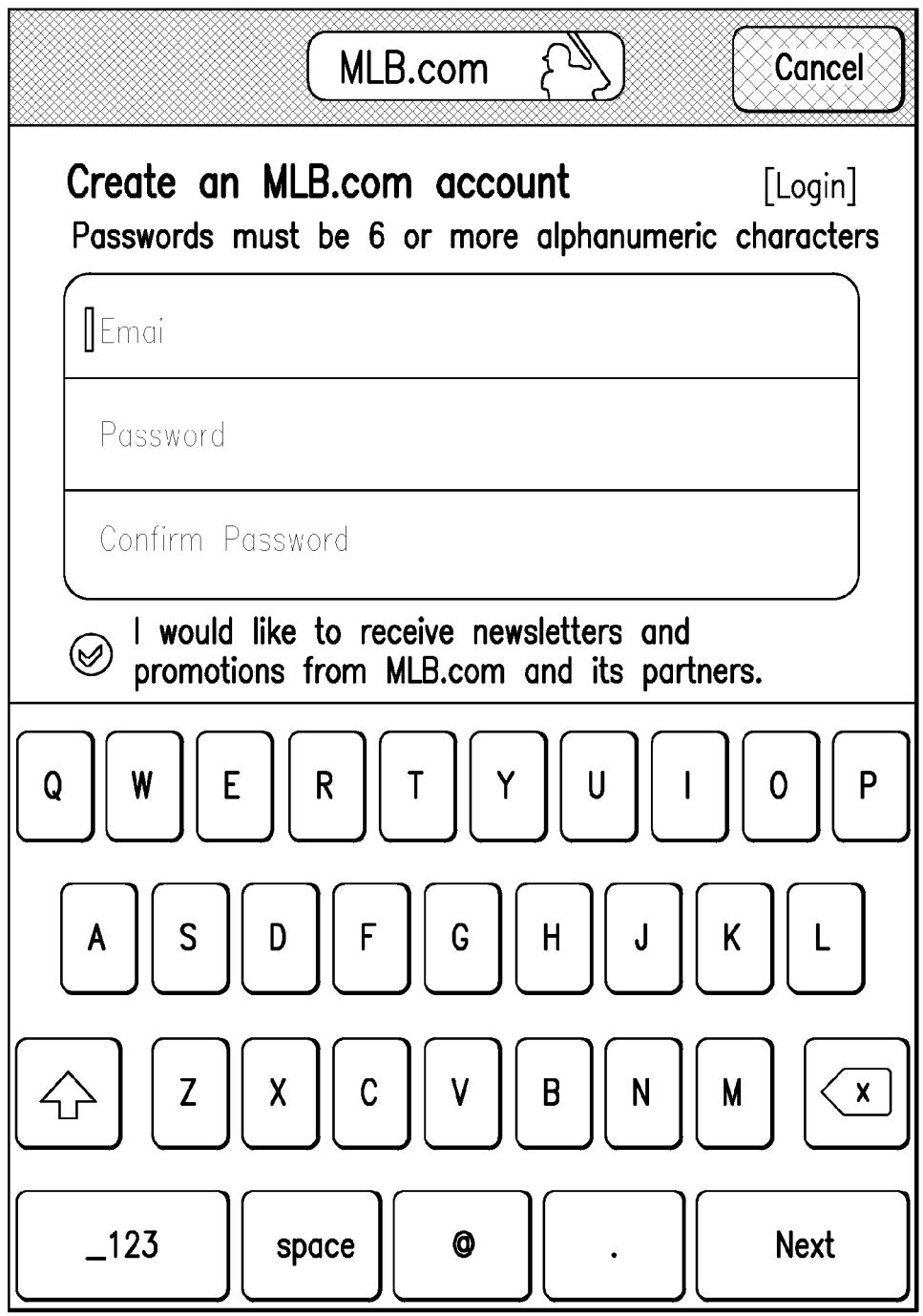

FIG. 6G illustrates an exemplary user interface 600h displaying event highlights at the venue (e.g., YANKEES game at the YANKEE STADIUM). In some embodiments, the highlights displayed in FIG. 6G may be accessed by clicking on the "highlights" option in FIG. 6B. In these embodiments, the user may view the highlights displayed in FIG. 6G even if not physically present at the event. In other embodiments, the user may have access to more information regarding the event if the user has successfully checked into the event. FIG. 6I illustrates an exemplary user interface allowing the user to create an MLB.com account using the client device (e.g., a mobile device).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication networks can include, for example, packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., Wi-Fi network, RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device, and/or the like), and/or other communication devices. The browser device includes, for example, a computer (e.g., desktop computer, laptop computer, mobile device or the like) with a world wide web browser (e.g., MICROSOFT® INTERNET EXPLORER® available from MICROSOFT CORPORATION, MOZILLA® FIREFOX available from MOZILLA CORPORATION, and/or the like). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media is non-transitory in nature and includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for accessing content on a client device at an event, the method comprising:
   receiving a request to check-in to the event from the client device, the check-in request including geographic location information of the client device;
   determining whether the client device is located at a venue holding the event based on the received geographic location information of the client device and a first predetermined radius;
   determining whether the event at the venue is in progress; and
   based upon determination that the client device is located at the venue and the event is in progress, transmitting a first plurality of event information to the client device.

2. The method of claim 1, wherein based upon determination that the client device is not at the venue, determining one or more venues within a second predetermined radius of the client device.

3. The method of claim 2, further comprising transmitting information regarding the one or more venues to the client device.

4. The method of claim 1, wherein the received location information includes latitude and longitude of the client device.

5. The method of claim 4, wherein the received location information includes a confidence level indication.

6. The method of claim 1, wherein based upon determination that the client device is not at the venue or the event is not progress, transmitting a second plurality of event information to the client device.

7. The method of claim 6, wherein the second plurality of event information is a subset of the first plurality of event information.

8. The method of claim 1, further comprising: transmitting a notification to a social network application regarding the client device checked into the event.

9. The method of claim 1, wherein the client device is a mobile device.

10. The method of claim 1, wherein the received geographic location of the client device is determined by the client device based on one or more of the following: GPS, cell-tower, and Wi-Fi triangulation.

11. The method of claim 1, wherein determining whether the client device is at the venue is based on the received geographic location of the client device and a predefined coordinate map of the venue.

12. The method of claim 1, further comprising
   determining compliance with one or more rules associated with the geographic location of the client device.

13. The method of claim 1, wherein the first plurality of event information includes an instant re-play of a portion of the event.

14. The method of claim 1, wherein the first plurality of event information includes event statistics.

15. The method of claim 1, wherein the first plurality of event information includes event commentary.

16. The method of claim 1, wherein the first plurality of event information includes transportation information.

17. The method of claim 1, wherein the first plurality of event information includes weather updates.

18. The method of claim 1, wherein the first plurality of event information includes information about another event.

19. The method of claim 1, wherein the first plurality of event information includes highlights and/or instant replays.

20. A non-transitory computer-readable storage medium, the non-transitory computer-readable storage medium comprising a set of processor executable instructions that when executed by a processor configure a computing apparatus to:
   receive a request to check-in to the event from the client device, the check-in request including geographic location information of the client device;
   determine whether the client device is at a venue holding the event based on the received geographic location information of the client device and a first predetermined radius;
   determine whether the event at the venue is in progress; and
   based upon determination that the client device is at the venue and the event is progress, transmit a first plurality of information relating to the event to the client device.

* * * * *